United States Patent [19]

Sweeney

[11] 4,279,620

[45] Jul. 21, 1981

[54] NOVEL PROCESS FOR TREATING GASAHOL

[75] Inventor: William M. Sweeney, Wappingers Falls, N.Y.

[73] Assignee: Texaco Inc., White Plains, N.Y.

[21] Appl. No.: 138,028

[22] Filed: Apr. 7, 1980

[51] Int. Cl.³ ............................................... C10L 1/12
[52] U.S. Cl. .......................................... 44/56; 44/51
[58] Field of Search ..................................... 44/51, 56

[56] References Cited

U.S. PATENT DOCUMENTS 3,036,901  5/1962  Sanders, Jr. et al. .................... 44/67

*Primary Examiner*—Patrick Garvin
*Assistant Examiner*—J. V. Howard
*Attorney, Agent, or Firm*—Carl G. Ries; Robert A. Kulason; Carl G. Seutter

[57] ABSTRACT

A water-containing gasoline or gasahol is contacted with a substantially saturated aqueous solution of calcium chloride plus solid calcium chloride; and dry gasahol is recovered.

11 Claims, 1 Drawing Figure

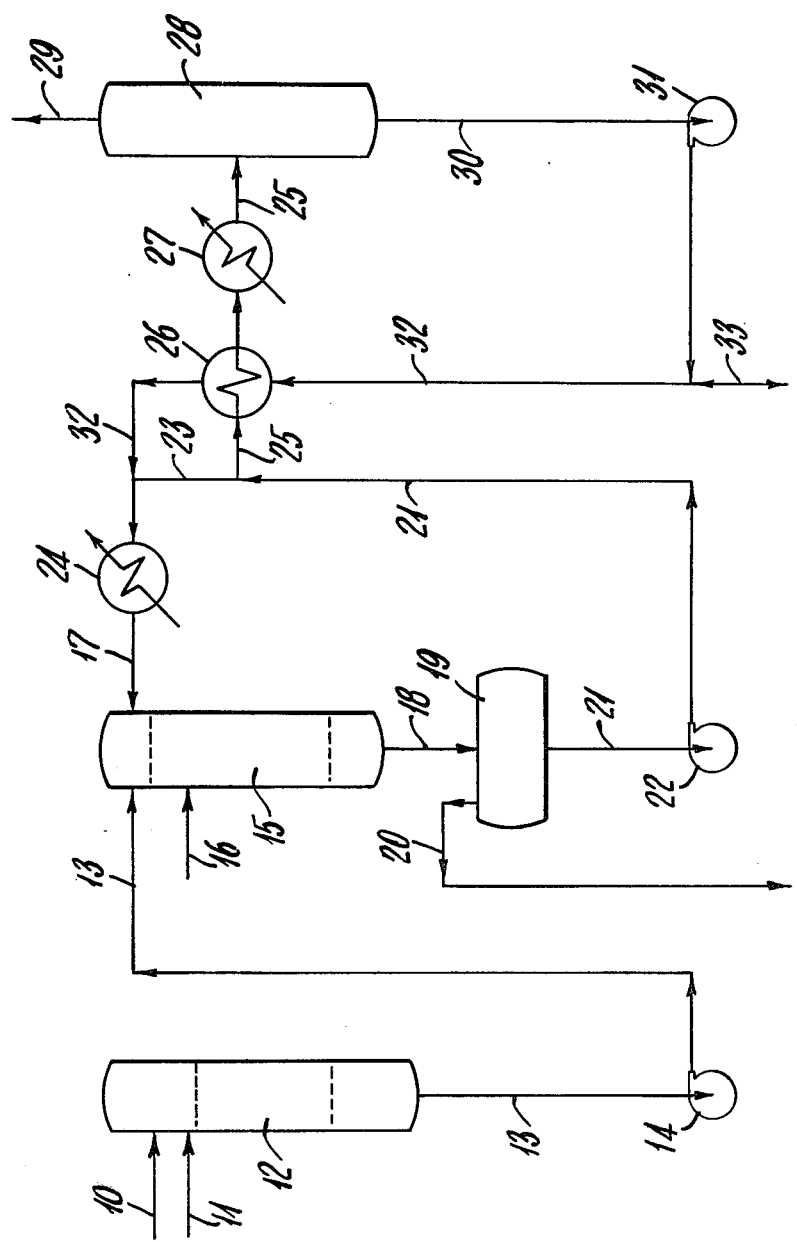

NOVEL PROCESS FOR TREATING GASAHOL

FIELD OF THE INVENTION

This invention relates to a novel method of removing water from gasoline (including naphtha) and from gasahol containing a water-miscible alcohol, and to the compositions so obtained. More particularly it relates to the drying of a gasoline-ethanol or gasoline-methanol mixture containing water, to prevent phase separation.

BACKGROUND OF THE INVENTION

As is well known to those skilled in the art, liquid hydrocarbons may be combined with alcohols, typically water-miscible alcohols. Typical of such products is gasahol, a mixture of motor fuel, such as gasoline or naptha with an alcohol, such as ethanol. It is found that such mixtures are normally single-phase mixtures when formulated from eg gasoline and anhydrous ethanol; but those formulated from gasoline and 95 w % ethanol are two phase mixtures characterized at best by a haze and at worst by separation into a water phase and a hydrocarbon phase. Even gasahol prepared from dry gasoline and anhydrous ethanol picks up water from various sources during handling; and the presence of this water in amounts as small as 0.1 v %–4 v % (depending on the temperature and the composition of the product) may cause the composition to separate into two phases: (i) a hydrocarbon phase and (ii) an alcohol-water phase.

It is an object of this invention to provide a method of treating such mixtures to prevent formation of more than one phase. Other objects will be apparent to those skilled in the art.

STATEMENT OF THE INVENTION

In accordance with certain of its aspects, this invention is directed to a method of treating a charge water-containing gasoline or gasahol fuel which comprises contacting said charge water-containing gasoline or gasahol with a substantially saturated aqueous solution of calcium chloride in the presence of solid calcium chloride thereby forming a multi-phase system including (i) a first phase containing substantially dry gasoline or gasahol and (ii) a second phase containing substantially saturated aqueous solution of calcium chloride; and recovering said first phase containing substantially dry gasoline or gasahol.

DESCRIPTION OF THE INVENTION

The compositions which may be treated by the method of this invention include liquid hydrocarbon fuels. Although it is possible to treat liquid hydrocarbon fuels of lower molecular weight, the advantages of this invention are particularly apparent when the hydrocarbon fuel is a liquid at ambient conditions, typically 25° C. and atmospheric pressure.

The liquid hydrocarbon fuel may typically be a motor fuel such as a gasoline (including) naphtha, etc. When the fuel is a gasoline, it may for example be a 100 octane blended gasoline having an ep of 320° F. When the fuel is a naphtha it may be characterized by its ibp of 200° F. and its ep of 320° F.

It is a particular feature of the process of this invention that it finds use in treating gasahol which is made by mixing gasoline and wet alcohol—preferably gasoline and 95 w % ethanol. Typically such a gasahol may be formulated by mixing 90 volumes (129 parts) of dry gasoline with 10 volumes (12.7 parts) of 95 w % ethanol. Mixing may be effected in a mixing tank or by passing the mixture through a bed of inert packing. The gasahol so prepared is found to be a two-phase mixture; and depending on the temperature and the relative amount of the components may be a hazy gasoline or two phases may be visible.

The so-prepared mixture is contacted with a saturated aqueous solution of calcium chloride in the presence of solid calcium chloride. Although the saturated aqueous solution may contain as little as eg 95 w % of the amount of calcium chloride necessary to form a saturated solution, it is preferred that the solution be 100% saturated at the temperature of operation, which may be 40° F.–120° F., preferably 60° F.–90° F., say 70° F. At the preferred temperature of operation of 70° F., a saturated aqueous solution contains about 45 w % calcium chloride i.e. 81 parts of calcium chloride per 100 parts of water.

It may be possible to effect the process of this invention by mixing the charge gasoline or gasahol with the saturated aqueous solution of calcium chloride and solid calcium chloride in a mixing tank. The gasoline or gasahol (100 parts) may be contacted with 0.1-100 parts preferably 1-10 parts, say 10 parts of solid calcium chloride and 0.1–20 parts, preferably 1-10 parts, say 2 part of aqueous calcium chloride solution. It is found however that more facile operation may be achieved if the mixture of liquids (gasoline or gasahol and saturated aqueous calcium chloride solution) is passed through a bed of solid calcium chloride. Make-up solid calcium chloride may be added to the bed from time to time to replenish that which is dissolved out.

The mixture of gasoline or gasahol and aqueous calcium chloride solution is withdrawn from the contacting operation and passed to a settling operation. The upper layer of gasoline or gasahol is separated and withdrawn. The gasoline or gasahol so obtained is commonly found to contain less than 0.4 w % water and to be a single-phase system free of haze at 70° F. room temperature.

The lower phase, and aqueous solution of calcium chloride, commonly containing calcium chloride in amount of 95 w %–99 w %, preferably 95 w %–98 w %, say 97 w % of the saturation level at the temperature of operation, is withdrawn. So long as the concentration of calcium chloride in this liquid is above about 95 w % of the saturation value (i.e. above about 42 w % at the preferred operating temperature of 70° F.), this liquid may be recycled to the contacting operation, with adjustment of temperature if necessary.

When the concentration of calcium chloride drops below this level, a portion of the recycling liquid may be passed to a flashing operation wherein it may be concentrated. In a preferred embodiment, a portion of the recycling stream is continuously passed to the flashing operation. It may be heated by exchange against the flashed bottoms and then further heated to 300° F.–500° F., say 400° F. and passed into a flash drum wherein water is flashed off and removed as overhead. The flashed bottoms, preferably a saturated solution, is withdrawn, cooled against the charge to flashing and recycled to the contacting operation. Preferably the temperature of the aqueous solution admitted to the contacting operation is 40° F.–120° F., say 70° F.; and heat exchange is provided to lower the temperature to this point.

Practice of the process of this invention will be apparent to those skilled in the art from the examples which follow in which as elsewhere in this description, all parts are parts by weight unless otherwise stated:

DESCRIPTION OF PREFERRED EMBODIMENTS

EXAMPLE I

In the drawing, which is a schematic flowsheet of the best mode contemplated for carrying out the process of this invention, 129 parts of gasoline (containing less than 0.1 w % water) are admitted through line 10 together with 12.7 parts of 95 w % ethanol through line 11 to mixing operation 12. Although it may be possible to utilize a mixing tank (with or without agitation) preferably operation 12 may include a packed bed. There is removed through line 13 a two phase gasahol composition which is pumped at ambient temperature (ca 70° F.) through pump 14 to contacting operation 15.

In contacting operation 15, there is a bed of solid calcium chloride (schematically shown as being replenished through line 16). There is also admitted to contacting operation 15 through line 17 aqueous saturated calcium chloride solution (5 parts) at 70° F. containing 45 w % calcium chloride.

As the charge two-phase gasahol from line 13 passes downwardly (together with the saturated calcium chloride solution) through the bed of calcium chloride at 70° F. water is extracted from the gasahol. There is recovered through line 18 product containing (i) a gasahol phase including 129 parts of gasoline, 12.3 parts of ethanol, and less than 0.4 parts of water and (ii) a substantially saturated calcium chloride solution including 3.38 parts of water and 2.21 parts of calcium chloride.

Product in line 18 is passed to settling operation 19 from which there is withdrawn through line 20 about 142 parts of gasahol containing 129 parts of gasoline, 12.3 parts of ethanol, and less than 0.4 parts of water. The second heavier aqueous phase in settler 19 containing 3.38 parts of water and 2.25 parts of calcium chloride is removed through line 21 and pump 22. So long as the concentration of calcium chloride in line 21 is at least 95 w % of the saturation value, the stream in line 20 is passed through line 23 and line 17 to operation 15. The temperature of the stream in line 17 may be adjusted by heat exchanger 24.

If it be found that the concentration of calcium chloride in line 20 is below 95 w % of the saturation value, at least a portion of that stream is passed through line 25 and heat exchangers 26 and 27 wherein the stream in line 25 is heated to 400° F. before being passed to flashing operation 28. Water is removed overhead in line 29; and saturated solution recovered as flashed bottoms in line 30 is pumped by pump 31 through lines 32 and 17 to operation 15. Calcium chloride solution may be added or withdrawn through line 33.

EXAMPLES II-VI

In these comparative Examples, a gasahol is used which is formulated from 90 parts of dry gasoline (containing less than 0.1 w % water) and 10 parts of 95 w % ethanol. In each instance, there is added to the gasahol a "drying system" as indicated at 70° F. The mixture is agitated for 10 seconds at 70° F. and the gasahol is separated and its water content determined.

| Example | Drying System |
|---|---|
| II* | 10 parts CaCl$_2$ solid |
| III* | 5 parts CaCl$_2$ solid |
|  | 5 parts 30 w % CaCl$_2$ aqueous solution |
| IV* | 15 parts 42 w % CaCl$_2$ aqueous solution |
| V* | 10 parts saturated (45 w %) CaCl$_2$ aqueous solution |
| VI | 2 parts saturated (45 w %) CaCl$_2$ aqueous solution |
|  | 10 parts CaCl$_2$ solid |

The water content of the gasahol may be determined.

| Example | Water Content |
|---|---|
| II* | 0.17 |
| III* | 0.15 |
| IV* | 0.3 |
| V* | 0.2 |
| VI | 0.11 |

From the above comparative Examples, it will be apparent that the Control Examples II*-V* permit attainment of gasahol containing as much as 0.3 w % water whereas Experimental Example VI permits attainment of a product gasahol containing 0.11 w % water—this being attained in the brief operating time of 10 seconds.

EXAMPLE VII

In this Example 100 parts of wet gasoline containing 99 parts of gasoline and 1 part of water (dissolved water plus free water) are mixed at 70° F. with 10 parts of solid calcium chloride and 2 parts of saturated (45 w %) aqueous calcium chloride solution. The mixture is agitated for 10 seconds at 70° F. and the two phases separated. The gasoline phase is found to contain only about 0.009 parts of dissolved water i.e. the water content has been reduced from 1 w % down to 0.009 w %.

Although this invention has been illustrated by reference to specific embodiments, it will be apparent to those skilled in the art that various changes and modifications may be made which clearly fall within the scope of this invention.

I claim:

1. The method of treating a charge containing at least one fuel selected from the group consisting of water-containing gasoline and water-containing gasohol which comprises contacting said charge water-containing fuel with a substantially saturated aqueous solution of calcium chloride in the presence of solid calcium chloride thereby forming a multi-phase system including (i) a first phase containing substantially dry fuel and (ii) a second phase containing substantially saturated aqueous solution of calcium chloride; and recovering said first phase containing substantially dry fuel.

2. The method of treating a charge as claimed in claim 1 wherein said multi-phase system includes (i) a third phase containing solid calcium chloride.

3. The method of claim 1 wherein said charge is gasoline.

4. The method of claim 1 wherein said charge is gasahol.

5. The method of claim 1 wherein said charge is gasahol prepared from gasoline and ethanol.

6. The method of claim 1 wherein said charge is gasahol prepared from gasoline and 95 w % ethanol.

7. The method of claim 1 wherein said aqueous solution of calcium chloride contains calcium chloride in amount of at least about 95 w % of the saturation value at temperature of operation.

8. The method of claim 1 wherein temperature of said treating is ambient temperature.

9. The method of treating a charge water-containing gasahol which comprises contacting said charge water-containing gasahol at 40° F.–120° F. with a substantially saturated aqueous solution of calcium chloride in the presence of solid calcium chloride thereby forming a multi-phase system including (i) a first phase containing substantially dry gasahol and (ii) a second phase containing substantially saturated aqueous solution of calcium chloride; and recovering said first phase containing substantially dry gasahol.

10. The method of treating a charge water-containing gasoline which comprises contacting said charge water-containing gasoline with a substantially saturated aqueous solution of calcium chloride in the presence of solid calcium chloride thereby forming a multi-phase system including (i) a first phase containing substantially dry gasoline and (ii) a second phase containing substantially saturated aqueous solution of calcium chloride; and recovering said first phase containing substantially dry gasoline.

11. The method of treating a charge containing at least one fuel selected from the group consisting of water-containing gasoline and water-containing gasahol which comprises forming a mixture of (i) said water-containing fuel and (ii) a substantially saturated aqueous solution of calcium chloride through a bed of solid calcium chloride thereby forming a multi-phase system including (i) a first phase containing substantially dry fuel and (ii) a second phase containing substantially saturated aqueous solution of calcium chloride;

withdrawing said multi-phase system from said bed of solid calcium chloride;

separating said first phase and said second phase in said withdrawn multi-phase system; and recovering said first phase containing substantially dry fuel.

* * * * *

UNITED STATES PATENT AND TRADEMARK OFFICE
CERTIFICATE OF CORRECTION

PATENT NO. : 4,279,620
DATED : July 21, 1981
INVENTOR(S) : William M. Sweeney

It is certified that error appears in the above—identified patent and that said Letters Patent is hereby corrected as shown below:

Column 2, line 42 change "and" to -- an --;

Column 6, line 12, cancel "forming", insert -- passing --.

Signed and Sealed this

Second Day of March 1982

[SEAL]

Attest:

GERALD J. MOSSINGHOFF

Attesting Officer       Commissioner of Patents and Trademarks